United States Patent [19]
Graff

[11] Patent Number: 5,518,385
[45] Date of Patent: May 21, 1996

[54] APPARATUS FOR RESIN TRANSFER MOLDING

[75] Inventor: John Graff, West Suffield, Conn.

[73] Assignee: United Technologies Corporation, Hartford, Conn.

[21] Appl. No.: 336,409

[22] Filed: Nov. 9, 1994

[51] Int. Cl.$^6$ ................................... B29C 45/14
[52] U.S. Cl. .................... 425/127; 264/102; 264/257; 264/511; 264/553; 264/571; 264/DIG. 78; 425/129.1; 425/150; 425/388; 425/405.2; 425/546; 425/DIG. 60
[58] Field of Search ................................ 425/127, 129.1, 425/150, 388, 405.1, 405.2, 546, DIG. 60; 264/101, 102, 257, 511, 553, 571, DIG. 78

[56] References Cited

U.S. PATENT DOCUMENTS

| | | | |
|---|---|---|---|
| 5,041,182 | 8/1991 | Sekiguchi et al. . | |
| 5,130,071 | 7/1992 | Iseler et al. . | |
| 5,236,636 | 8/1993 | Tisack | 264/571 |
| 5,236,646 | 8/1993 | Cochran et al. . | |
| 5,248,467 | 9/1993 | Cushman . | |
| 5,275,549 | 1/1994 | Yamasaki . | |
| 5,281,388 | 1/1994 | Palmer et al. . | |
| 5,322,665 | 6/1994 | Bernardon et al. | 264/257 |
| 5,370,521 | 12/1994 | McDougall | 425/DIG. 60 |
| 5,435,953 | 7/1995 | Osada et al. | 264/102 |

*Primary Examiner*—Tim Heitbrink
*Attorney, Agent, or Firm*—McCormick, Paulding & Huber

[57] ABSTRACT

In an apparatus and method for resin transfer molding, a mold including at least two cooperating mold sections is placed in a vacuum chamber. A reinforcing material is positioned between the mold sections, which are separated from one another during evacuation of the chamber, thus maintaining the reinforcing material in a substantially uncompressed condition, to ensure that all gasses and/or liquids are evacuated from the reinforcing material and the mold prior to resin injection. After evacuation, the mold sections are brought almost into engagement to substantially define a mold cavity, and resin is injected into the mold cavity. Prior to terminating the resin injection, the mold sections are brought into engagement, and final resin injection is performed. The injected resin is then cured in accordance with the particular type of resin injected.

8 Claims, 3 Drawing Sheets

5,518,385

APPARATUS FOR RESIN TRANSFER MOLDING

FIELD OF THE INVENTION

The present invention relates to apparatus and methods for resin transfer molding, and more particularly to such an apparatus and method wherein the reinforcing material or structural preform is degassed in an uncompressed condition prior to impregnation of the material with resin.

BACKGROUND OF THE INVENTION

In a typical resin transfer molding process, a dry reinforcing material for the part to be manufactured is placed within two or more mold sections which are brought into engagement to define a mold cavity, thereby compressing the reinforcing material. The mold cavity is then evacuated, and a liquid resin is injected into the mold cavity. The resin is absorbed by the reinforcing material, and is then cured to form the part. Typical dry reinforcing materials include fiberglass, graphite, carbon and Kevlar fibers, which are often braided or woven into a sheet form. The resins are typically epoxy resins, although other types of resins, such as polyester and bismaleimide resins and resin aleimides, are also employed.

In FIG. 1, a prior art system 2 for resin transfer molding is illustrated, and includes a steel mold 4 in two sections 6, 8 the mating surfaces of which are urged together by a press 10 to define a mold cavity 12. Each of the mold sections defines a portion of a groove 14 on a mating surface and around the mold cavity 12, and an O-ring seal 16 is positioned in the groove 14 prior to pressing the mold sections together. The o-ring 16 serves to separate the mold cavity 12 and the environment surrounding the apparatus 2. Also prior to pressing the mold sections together, a dry reinforcing material 18, formed at least in part of purposely braided purposely aligned or woven fibers, is positioned in the mold cavity 12. After positioning the reinforcing material 18 and the o-ring 16, the mold sections 6, 8 are brought together to compress the reinforcing material and to define the mold cavity, which is then evacuated using a vacuum pump 20. A resin injector 22 then injects preheated resin under pressure into the mold cavity 12. As the heated, pressurized resin is injected into the mold cavity 12, it is absorbed by and saturates or wets the surfaces of the reinforcing material 18. Additional resin is injected into and bled from the mold cavity to remove air from the cavity that either was not evacuated from or leaked into the cavity. Accordingly, the O-ring 16 performs two duties during the production of a part, (1) forming a seal to maintain a vacuum in the evacuated mold cavity 12 and (2) to keep resin within the mold during injection of the pressurized resin. After the resin injection is completed, the injected resin is cured using a time/temperature cure cycle appropriate for the particular resin.

A mold cavity evacuated of all gases and liquids is essential to a well-formed resin transfer molded part, which is characterized by an absence of air pockets, voids and dry areas in the part, and by complete saturation with resin of the reinforcing material. However, it is not uncommon for some gasses and/or liquids to remain in the evacuated reinforcing material and the mold cavity in the prior art apparatus. Moreover, leakage occurs between the O-ring and the mating portions of the mold sections, or at some other opening to the mold. The unevacuated or leaked gasses and/or liquids result in parts which contain defects such as the air pockets, voids and dry areas mentioned above, and by incomplete saturation with resin of the reinforcing material. Such defects result in a part having a substantially reduced strength compared to a part without defects. The reduction in strength is typically very difficult to determine without destroying the part, and accordingly defective parts are typically unusable. The resultant wasted materials and time associated with discarded resin transfer molded parts is substantial, as a new part must be produced. In addition, the necessary additional investment of time and materials necessary to repair the defects, if repair is possible, is also substantial.

With respect to the additional resin used to bleed air from the mold, the volume of additional resin injected into the mold cavity to remove air that either was not originally evacuated from the cavity or which leaked into the cavity is typically equal to the volume of the part being produced. The resin can cost several hundreds of dollars per gallon, and the bled resin is typically not reusable. Thus, for a large part which has a volume equal to several gallons of resin, for example a helicopter rotor blade, the additional several gallons of resin for bleeding purposes can result in an additional cost of several thousand dollars to produce the part. Moreover, injecting and bleeding additional resin may or may not remove all of the air from the mold cavity, and thus the consistency of resulting parts is poor.

It is an object of the present invention to overcome the drawbacks and disadvantages of such prior art apparatus and methods for resin transfer molding.

SUMMARY OF THE INVENTION

The present invention is directed to an apparatus and method for resin transfer molding in which a reinforcing material is degassed in a substantially uncompressed condition prior to being impregnated with resin.

According to the present invention, an apparatus for resin transfer molding, in which a dry reinforcing material is degassed in a substantially uncompressed condition and impregnated with resin, includes a sealable vacuum chamber that defines an outlet port. A mold is enclosed within the sealed chamber, and includes two or more cooperating mold sections which define a mold cavity and receive the reinforcing material and resin therein. The mold sections are supportably moveable relative to one another, and each mold section defines a portion of the mold cavity so as to define the mold cavity when moved into engagement with one another. A vacuum pump is coupled in fluid communication with the outlet port of the chamber for evacuation of the chamber. A controller controls the movement of the mold sections, the operation of the vacuum pump and the resin injector, such that the mold sections are positioned in a first, spaced-apart relationship in which the reinforcing material remains in a substantially uncompressed condition and the mold cavity communicates with the vacuum chamber, so that the vacuum pump evacuates the vacuum chamber, mold cavity and reinforcing material. After evacuation, the controller moves the mold sections into a second, spaced-apart relationship in which the mold sections are brought almost into engagement, and then resin is injected into the mold cavity. Preferably, at or near the end of resin injection, the mold sections are brought into engagement to completely seal the mold cavity from the vacuum chamber.

Another aspect of the present invention is directed to a method of resin transfer molding in which a dry reinforcing material is degassed and impregnated with resin, comprising the steps of positioning a mold in a sealable vacuum chamber, the mold comprising two cooperating mold sections defining a mold cavity and being moveable relative to one another; positioning the reinforcing material between the mold sections; sealing the vacuum chamber; evacuating the vacuum chamber to provide a pressure in the chamber lower than atmospheric pressure in the vacuum chamber; degassing the reinforcing material by maintaining the mold sections in a first spaced apart relationship during the step of evacuating, the mold cavity communicating with the vacuum chamber while the mold sections are in the first spaced-apart relationship and maintaining the reinforcing material in a substantially uncompressed condition during the step of evacuating; maintaining the mold sections in a second spaced apart relationship during the step of injecting resin, the mold cavity being substantially sealed from the vacuum chamber while the mold sections are in the second spaced-apart relationship; and injecting resin into the reinforcing material in the cavity.

According to another aspect of the present invention, a resin impregnated article is produced in accordance with the method comprising the steps of positioning a mold in a sealable vacuum chamber, the mold comprising two cooperating mold sections defining a mold cavity and being moveable relative to one another; positioning the reinforcing material between the mold sections; sealing the vacuum chamber; evacuating the vacuum chamber to provide a pressure in the chamber lower than atmospheric pressure in the vacuum chamber; degassing the reinforcing material by maintaining the mold sections in a first spaced apart relationship during the step of evacuating, the mold cavity communicating with the vacuum chamber while the mold sections are in the first spaced-apart relationship and maintaining the reinforcing material in a substantially uncompressed condition during the step of evacuating; maintaining the mold sections in a second spaced apart relationship during the step of injecting resin, the mold cavity being substantially sealed from the vacuum chamber while the mold sections are in the second spaced-apart relationship; and injecting resin into the reinforcing material in the cavity.

One advantage of the present invention is that the mold sections remain apart, and thus the reinforcing material within the mold cavity remains substantially uncompressed during evacuation of the vacuum chamber and thus of the reinforcing material. As a result, the gasses and/or liquids which might otherwise be trapped during and after the evacuation of a mold cavity containing compressed reinforcing material, and which result in the defects noted above, are evacuated. Accordingly, the defects associated with prior art molding apparatus and methods in which reinforcing material in a mold cavity is compressed prior to evacuation of the mold cavity are substantially eliminated.

Another advantage of the present invention is a lack of reliance on the integrity of the seal between the mold sections to keep gasses and liquids out of the mold cavity, since a chamber surrounding the mold is evacuated. When a suitable vacuum condition is maintained within the chamber, any gasses and/or liquids that leak into the vacuum chamber are evacuated by the vacuum pump. Accordingly, the defects in resin molded parts caused by such gasses and/or liquids in prior art molding apparatus and method are substantially eliminated.

Still another advantage of the present invention is that the mold sections remain slightly apart during, and are closed and compressed at or near the termination of resin injection. The final compression of the mold sections ensures the full wetting of all surfaces of the reinforcing material, and fills any voids that exist, to eliminate porosity in the molded part.

Yet another advantage of the present invention is that the injection and bleeding of additional resin to remove air from the mold cavity is not necessary. Accordingly, the wasted resin and resulting additional costs associated with prior art apparatus and methods are substantially avoided.

Other advantages of the present invention will become apparent in view of the following detailed description and accompanying drawings.

DETAILED DESCRIPTION OF THE PREFERRED EMBODIMENTS

Figure 2:
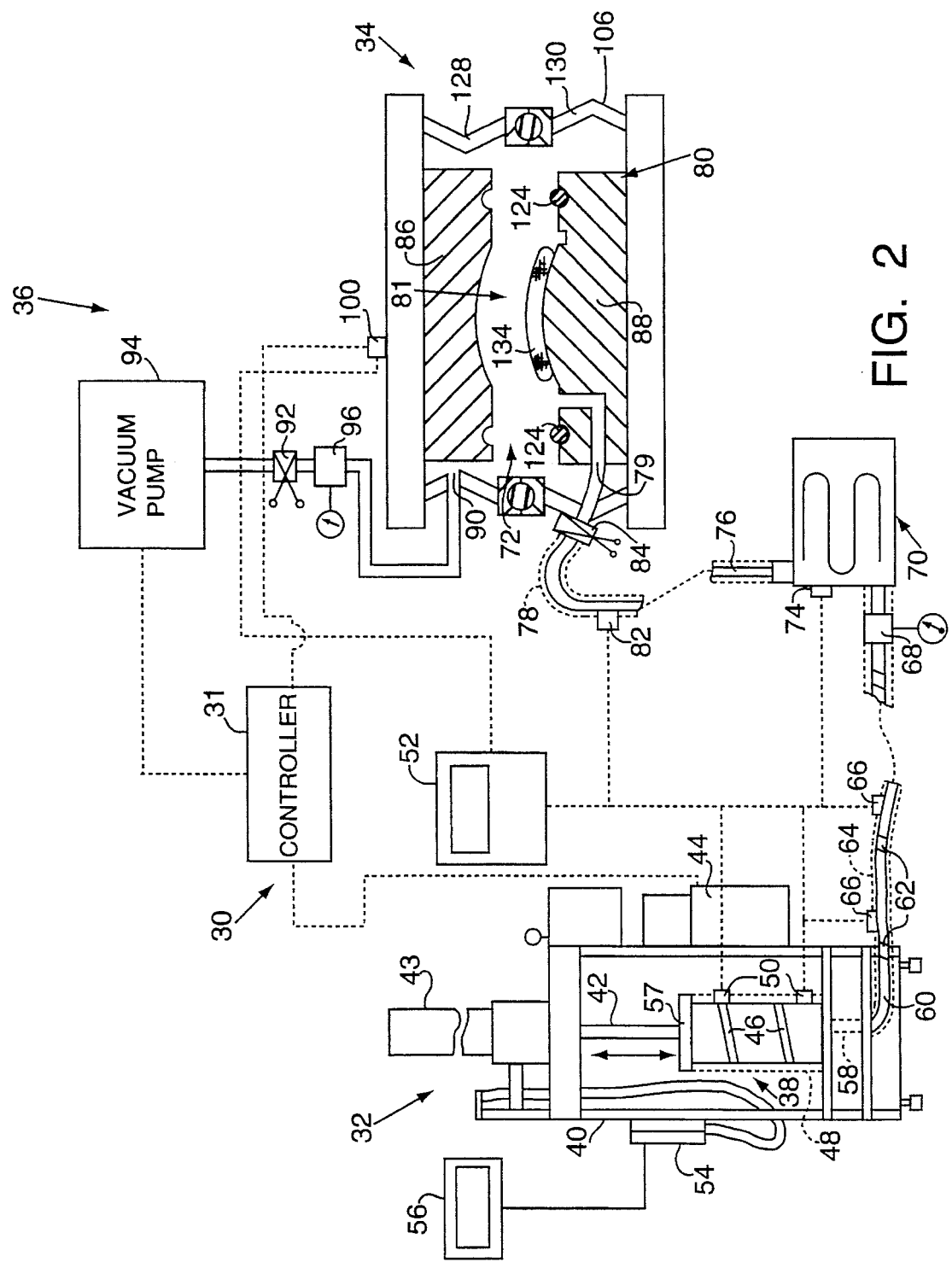
FIG. 2 is a schematic illustration of an apparatus for resin transfer molding embodying the present invention, and shows the mold sections in an open position.

In FIG. 2, an apparatus embodying the present invention for resin transfer molding is indicated generally by the reference numeral 30. The apparatus 30 comprises a controller 31, a resin injecting portion 32, a molding portion 34, and a vacuum portion 36. The controller 31 controls the operation of the resin injecting portion 32, the molding portion 34, and the vacuum portion. A typical resin injecting portion and vacuum portion is disclosed in U.S. patent application Ser. No. 08/168,070, entitled "Apparatus and Method For Resin Transfer Molding" filed on Dec. 13, 1993, assigned to the same assignee as is the present invention, and which is hereby expressly incorporated herein by reference.

The resin injecting portion 32 includes a heated resin pot 38 mounted within a frame 40 for delivering heated resin into a mold cavity of the mold portion 34, as described below. The heated resin pot 38 defines a substantially cylindrical bore extending through the resin pot, and one end of a piston 42 is received within the cylindrical bore. The other end of the piston 42 is coupled to a flame-mounted hydraulic cylinder 43, which is in turn coupled to a hydraulic pump 44, the operation of which is controlled by the controller 31, to drive the piston 42 within and through the bore of the resin pot 38. The hydraulic pressure of the cylinder 43 controllably maintains the resin flowing from the resin pot at one or more substantially constant, predetermined pressures, or within predetermined pressure ranges during resin injection, as described further below.

The resin pot 38 is heated by several electric heating elements 46, and a layer of insulating material 48 is wrapped over the heating elements to thermally insulate the heated resin pot, as illustrated by dashed lines in FIG. 2. Several thermocouples 50 are mounted on the resin pot 38 to measure the temperature of the resin pot, and each thermocouple is connected to a recording unit 52 for recording the temperature readings of the thermocouples. In the embodiment of the present invention illustrated, the recording unit 52 is a chart recorder, although it is noted that numerous types of recording units may equally be employed, which may, for example, record the temperature readings electronically, and store them in a database. The heating elements 46 are of a type known to those skilled in the art, and can be set, for example by the controller 31, to maintain the resin pot 38 at one or more substantially constant temperatures or within a predetermined temperature range.

A position sensor 54 is mounted on the frame 40 adjacent to the piston 42 to measure the stroke of the piston. The position sensor 54 is of a type known to those skilled in the pertinent art, and although numerous types of position sensors may equally be employed in the apparatus of the present invention, the particular unit employed in the embodiment of the present invention illustrated is a Sony Magnascale, model no. NA31-F. The position sensor 54 monitors the position of the piston 42, and the rate of piston movement, and transmits signals to a resin flow recording unit 56 indicative thereof. In the embodiment of the present invention illustrated, the flow recording unit 56 is a chart recorder, which records the piston travel vs. time throughout the resin transfer process in graphical format, as described further below. It is noted, however, that other types of recording units may equally be employed, such as recording units which electronically store the signals transmitted by the position sensor 54 and visually display the data on a monitor.

The resin pot 38 defines an inlet port 57 on one end for filling the resin pot with resin, and for receiving the piston 42, as shown in FIG. 2. An outlet port 58 is defined on the opposite end of the resin pot relative to the inlet port 57, and is coupled to a heated resin line 60 for introducing the resin into the resin line in response to the downward stroke of the piston 42, as is described further below. The resin line 60 includes several electric heating elements 62 for heating the resin line, and a layer of insulating material 64 is wrapped over the heating elements and the resin line for thermal insulation. Several thermocouples 66 are mounted to the resin line to monitor the temperature of the resin line. The thermocouples 66 are each coupled to the temperature recording unit 52, to record the resin line temperature, and the heating elements 62 are set, for example to the controller 31, to maintain one or more substantially constant predetermined temperatures of the resin line 60. A pressure sensor 68 is coupled to the resin line 60 to measure the pressure of the resin flowing through the line, which is maintained at one or more substantially constant pressure levels during resin injection by setting and controlling the hydraulic pressure of the cylinder 43.

The other end of the heated resin line 60 is coupled to a preheater 70 for preheating the resin to a resin molding temperature prior to molding. In FIG. 2, the preheater 70 is of a type known to those skilled in the art, and includes heating elements (not shown) for heating the resin to the resin molding temperature upon passage of the resin through the preheater. Several thermocouples 74 (one shown) are mounted to the preheater 70, and are in turn coupled to the temperature recording unit 52 to monitor and record the temperature of the preheater. The heating elements of the preheater 70 are set, for example to the controller 3 1, to maintain the resin discharged from the preheater at one or more substantially constant predetermined temperatures or within a predetermined temperature range.

Another heated resin line 76 wrapped in insulating material 78, as indicated by dashed lines in FIG. 2, is coupled in fluid communication between the preheater 70 and an inlet port 79 of a mold 80 within which the resin transfer molded part is molded, to introduce preheated resin into a mold cavity 81. Thermocouples, shown typically at 82, are mounted on the resin line 76 and are coupled to the temperature recording unit 52, to monitor and record the temperature of the resin line. The heating elements (not shown) of the resin line 76 maintain the resin flowing through the line at one or more substantially constant, predetermined temperatures or within a predetermined temperature range, under the control of the controller 31.

An inlet valve member 84 is coupled between the resin line 76 and the mold cavity 81 for controlling the flow of resin through the mold inlet port 79. In the embodiment of the present invention illustrated, the inlet valve member 84 is a mechanical clamp which closes or opens the line by actuating the clamp. It is noted, however, that numerous other types of clamp or valve mechanisms may equally be employed to control the flow of resin through the resin line 76 into the inlet port 79. As described further below, preheated resin is injected during molding through the inlet port 79 and into the mold cavity 81 defined by an upper mold section 86 and a lower mold section 88.

An outlet or vacuum port 90 is coupled in fluid communication with the vacuum chamber 72, and is coupled through a valve member 92 to a vacuum pump 94 for evacuating gasses and liquids from the vacuum chamber prior to introduction of the heated resin into the mold cavity 81. In the embodiment of the present invention illustrated, the valve member 92 is also a mechanical clamp, which closes or opens the line by actuating the clamp. A pressure sensor 96 is coupled to the vacuum line extending between the vacuum chamber 72 and the vacuum pump 94 to measure the pressure within the vacuum line, and thus within the vacuum chamber.

Figure 1:
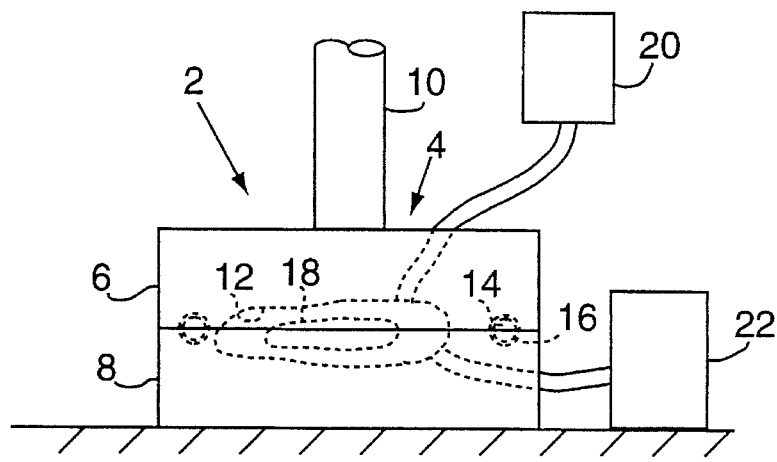
FIG. 1 is a schematic illustration of a prior art system for resin transfer molding.
Figure 3:
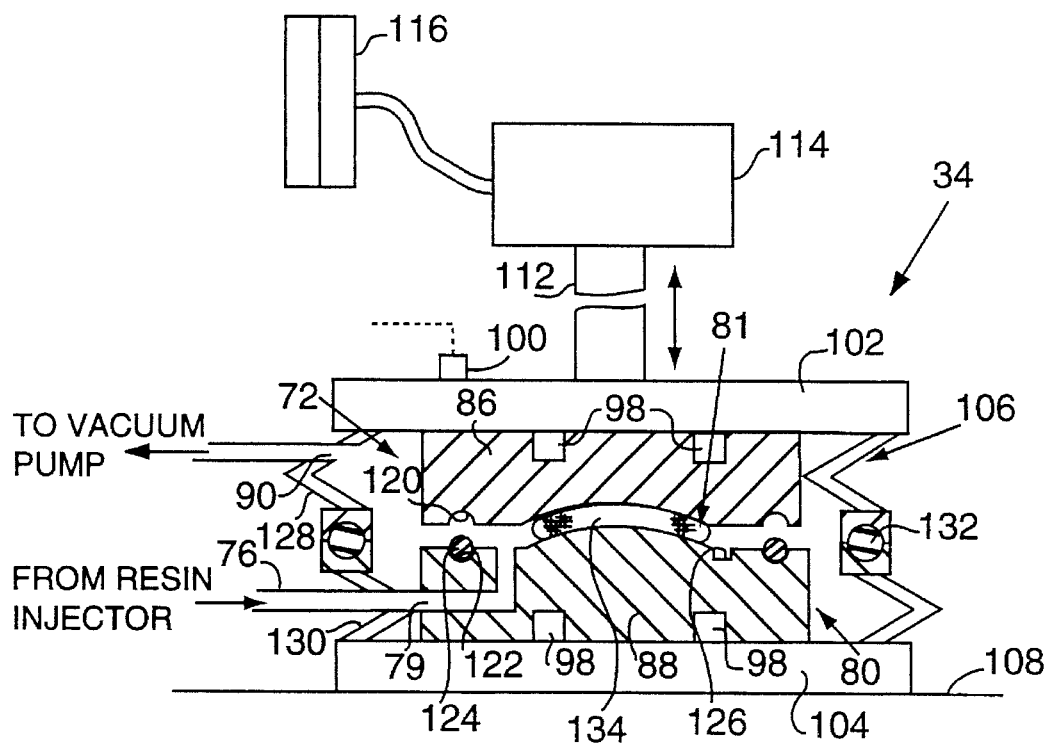
FIG. 3 is a schematic, sectional view of the mold of FIG. 2, illustrating the mold sections in a substantially closed position.

Turning now to FIG. 3, the mold 80 also includes heating elements 98 for heating the walls of the mold which define the mold cavity, and thermocouples, shown typically at 100, for monitoring the temperature of the mold. The thermocouples 100 are coupled to the temperature recording unit 52 (not shown in FIG. 3), to measure and record the temperature of the mold 80 and the heating elements 98 are set, for example by the controller 31 (not shown in FIG. 3), to maintain the temperature of the mold, and thus the mold cavity 81, at one or more substantially constant temperatures or within a predetermined temperature range.

The upper mold section 86 is removably fixed to an upper platen 102, and the lower mold section 88 is removably fixed to a lower platen 104, such that the vacuum chamber 72 is defined by the upper platen, the lower platen and an air-tight flexible member, indicated generally at 106, which extends between the upper and lower platens and around the mold 80. The lower platen 104 is fixed, for example, to a rigid mold table 108 to maintain the lower platen stationary. The upper mold section 86 and the lower mold section 88 are removably fixed in a manner known to those skilled in the art to allow for the use of different molds with the present invention.

The upper platen 102 is positioned over, and is moveable relative to, the lower platen 104, and in the illustrated embodiment the upper platen is moveable in a vertical direction toward and away from the lower platen. The upper platen 102 is supportably moved by a member 112, which in turn is driven by a hydraulic cylinder and pump, indicated generally by the reference numeral 114.

A position sensor is mounted adjacent to the member 112 to measure the stroke of the member. As with the sensor 54, the position sensor 116 is of a type known to those skilled in the art, and monitors the position of the member 112 to determine the distance between the upper mold section 86 and the lower mold section 88. The position sensor 116 transmits signals to a display 56 (not shown in FIG. 3) to indicate the gap between the mold sections.

Figure 4:
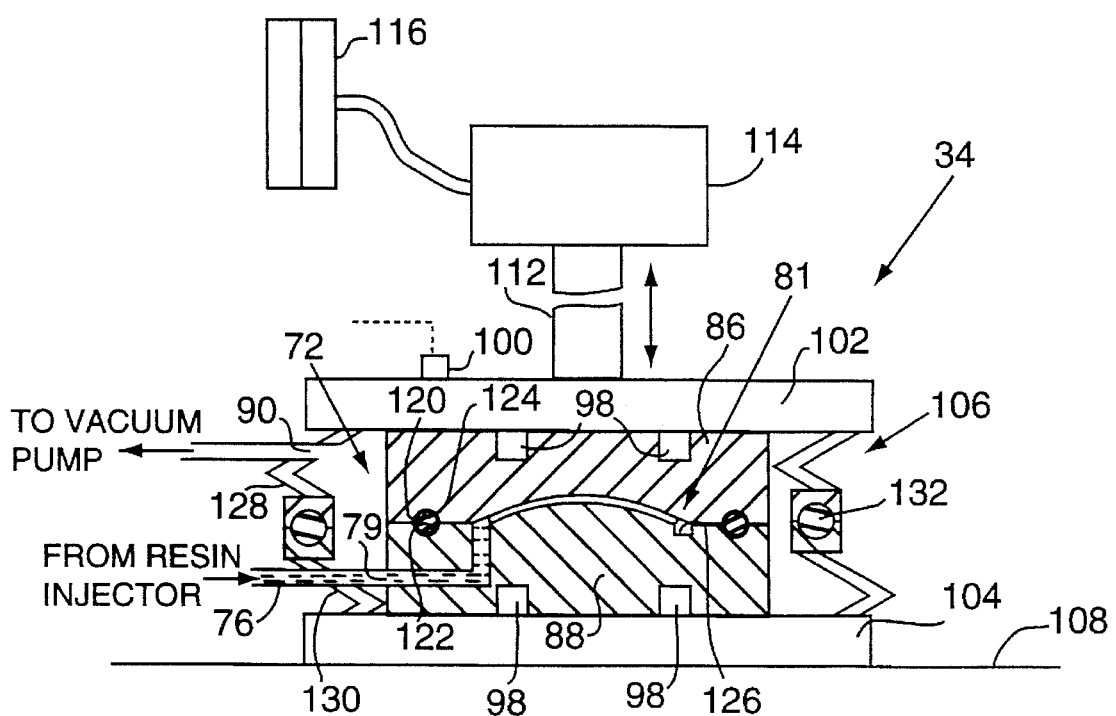
FIG. 4 is a view similar to FIG. 3, but shows the mold sections in engagement with one another.

As noted above, the upper and lower mold sections 86, 88 cooperate to define the mold cavity 81. In addition, each of the sections defines a cooperating groove portion 120, 122, respectively, which extends around the mold cavity-defining portion of each section. The mold cavity 81 is sealed by positioning an o-ring seal 124 between the groove portions 120, 122, and bringing the mold sections into engagement, as described below with respect to FIG. 4. As an alternative to the O-ring, a sealing rope (not shown) can be cut to an appropriate length to fit within the cooperating groove portions 120, 122, with the joined ends of the rope sealed using chromate putty or other known materials. In FIG. 3, the lower mold section 88 also defines a resin channel 126 which extends around the portion of the lower mold section 88 defining the mold cavity 81 and the portion defining the groove 122. The resin channel 126 communicates with the mold inlet port 79, and facilitates the injection of resin into the mold cavity 81.

The flexible member 106 shown in FIG. 3 is a flexible bellows including an upper and a lower portion 128 and 130 which are joined and sealed in a known manner including an O-ring 132 similar to the O-ring 124 described above. The flexible bellows 106 provides an air-tight seal for the vacuum chamber 72, and allows the platens to be moved relative to one another during the molding process, in which resin is injected into the mold cavity 81 to saturate a dry reinforcing material 134, as described below.

With reference to FIG. 2, in the operation of this apparatus and in accordance with a method of the present invention, a predetermined quantity of liquid resin is introduced into the resin pot 38, and the piston 42 is inserted through the inlet port 57 of the resin pot to pump the resin. The heating elements 46 are activated by the controller 31 to heat the resin within the resin pot 38 to an initial working temperature, and substantially to maintain the resin at the initial working temperature to maintain consistent operating conditions from one molded article to the next. The initial working temperature is higher than room temperature, but is below the molding temperature of the resin, i.e., below the threshold temperature for catalyzing the resin. In the embodiment of the present invention illustrated, the initial working temperature of the resin is preferably within the range of approximately 120° to 150° F. The heated resin line 60 is preferably heated to a temperature above the initial working temperature, for example, approximately 250° F., but also below the resin molding temperature.

Before or during the resin pot heating, the flexible bellows 106 are opened, the mold sections 86, 88 are separated from one another, and a dry reinforcing material 134 for the part to be resin transfer molded is placed on the mold cavity defining portion of the lower mold section 88. The mold sections 86, 88 are moved together as necessary to close the upper and lower bellows sections 128, 130 to seal the vacuum chamber 72, but maintained apart by a gap, e.g., about 1 inch between the mating portions of the mold sections 86, 88. After sealing the vacuum chamber 72, the vacuum pump 94 is started by the controller 31, to evacuate gasses and liquids from the chamber, the reinforcing material 134 and the mold cavity 81. Preferably, the vacuum chamber 72 is evacuated a sufficient amount to reduce and maintain, e.g., for one-half hour, the pressure in the chamber to a level on the order of one micron, which ensures that all gasses and liquids are removed from the dry reinforcing material 134, the mold cavity 81 and the vacuum chamber prior to resin injection.

As shown in FIG. 2, the mold sections 86, 88 are kept apart, e.g., by about 1 inch, during evacuation of the vacuum chamber 72. By keeping the sections 86, 88 apart during evacuation, the reinforcing material 134 remains uncompressed, and is more fully evacuated than if the reinforcing material were compressed prior to and during evacuation. Evacuation of gasses and liquids, and the maintenance of such an evacuation, is ensured by the air-tight seal of the vacuum chamber 72, and by monitoring the pressure level in the chamber during molding.

While the vacuum pump 94 evacuates the vacuum chamber 72, the mold sections 86, 88 are preheated, e.g., under the control of the controller 31, to a resin molding temperature, e.g., about 300° F. by activating the heating elements 98 in the upper and lower mold sections 86, 88. The preheater 70, resin line 76 and mold sections 86, 88 are heated to ensure that the resin reaches a resin molding temperature, e.g., about 310°–320° F., for at least 10 seconds after being introduced into the mold cavity 81. As shown in FIG. 3, after the desired vacuum level in the chamber 72 is reached and maintained for a predetermined time to ensure complete evacuation of the chamber, mold cavity 81 and dry reinforcing material 134, the controller 31 actuates the hydraulic pump and cylinder 114 to close the gap between the upper and lower mold sections 86, 88 to a predetermined distance as measured by the position sensor 116, e.g., about 0.02 inch. By bringing the mold sections 86, 88 closely together, the respective groove portions 120, 122 contact and slightly compress the O-ring seal 124, and the mold cavity 81 becomes a second vacuum chamber to prevent gasses and/or liquids which may leak into the vacuum chamber from entering the mold cavity 81 and resulting in a void or other defect in a molded part. Accordingly, any gasses and liquids which leak into the vacuum chamber 72 travel within the chamber until evacuated through the outlet port 90 by the vacuum pump 94. Thus it is only by chance that a particular gas molecule or liquid particle leaks into the vacuum chamber 72 and into the mold cavity 81.

Once the resin pot 38 and the resin lines 58, 76 are each preheated to their respective predetermined temperatures as measured by the thermocouples 66, 82, the hydraulic pump 44 and hydraulic cylinder 43 are actuated by the controller 31 to drive the piston 42, i.e., downwardly as shown in FIG. 2, and thereby pressurize the resin, e.g., to approximately 50 p.s.i., and cause resin to flow through the resin lines 60, 76 and the preheater 70. The resin is preferably injected at a flow rate, monitored during resin injection by the position sensor 54 of FIG. 2, calculated to substantially fill the mold cavity 81 in a predetermined time, e.g., 15 minutes.

At or near the termination of resin injection into the mold cavity 72, or at some other predetermined time, the hydraulic pump and hydraulic cylinder are further actuated to move the mold sections 86, 88 into engagement. This movement additionally compresses the o-ring seal 124 in the grooves 120, 122 to further seal the mold cavity 81 from the vacuum chamber 72. Also at this time, the pressure at which the resin is injected is increased by a predetermined amount, e.g., to 75 p.s.i. to complete filling of the mold cavity 81 and saturation of the dry reinforcing material 134. At a predetermined point after final closure of the upper and lower mold sections 86, 88, e.g., when the position sensor 54 indicates that the piston 42 has not moved for a time, e.g., 1 minute, the inlet valve 84 is shut and the resin injection is terminated. The lack of movement of the piston 42 for a predetermined time, e.g., 1 minute, indicates that resin completely fills the mold cavity 81. Thereafter, the molded article of resin and dry reinforcing material 134 is thermally cured within the closed mold cavity 81 for a predetermined time and at a predetermined temperature, e.g., 1 hour at 300° F.

One advantage of the present invention is that the mold sections remain apart, and thus the reinforcing material within the mold cavity remains substantially uncompressed, during evacuation of the vacuum chamber, mold cavity and reinforcing material. As a result, the gasses and liquids which are otherwise trapped during the evacuation of a mold cavity containing compressed reinforcing material, and which result in the defects noted above, is evacuated. Accordingly, the defects associated with prior art molding apparatus and methods in which reinforcing material in a mold cavity is compressed prior to evacuation of the mold cavity are substantially eliminated.

Another advantage of the present invention is a lack of reliance on the integrity of the seal between the mold sections to keep gasses and liquids out of the mold cavity, since the vacuum chamber surrounding the mold is evacuated. If a suitable vacuum is maintained within the vacuum chamber prior to and during resin injection, any gasses and/or liquids that leak into the vacuum chamber are evacuated by the vacuum pump, and only leak into the mold cavity by chance. Accordingly, the defects in resin molded parts caused by such gasses and/or liquids in prior art molding apparatus and methods are substantially eliminated.

Still another advantage of the present invention is that the mold sections remain slightly apart during, and are compressed closed at or near the termination of resin injection. The final compression of the mold sections ensures the full wetting of all surfaces of the reinforcing material, and fills any voids that exist, to eliminate porosity in the molded part. It will be noted by those skilled in the art that the terms "upper" and "lower" as used in the present specification are used only for purposes of clarity, and that the elements designated "upper" and "lower" can be oriented in different directions.

Yet another advantage of the present invention is that the injection and bleeding of additional resin to remove air from the mold cavity is not necessary. Accordingly, the wasted resin and resulting additional costs associated with prior art apparatus and methods are substantially avoided.

From the foregoing, an apparatus and method for resin transfer molding is disclosed in some detail. It will be recognized by those skilled in the pertinent art that numerous changes and modifications may be made without departing from the spirit and scope of the invention. Accordingly, the invention has been described by way of illustration rather than by limitation.

What is claimed is:

1. An apparatus for resin transfer molding in which a dry reinforcing material is degassed and impregnated with resin, said apparatus comprising:

vacuum chamber means for defining a sealable vacuum chamber and also defining an outlet port;

a mold positioned within the vacuum chamber and comprising cooperating mold sections which define a mold cavity and receive the reinforcing material and resin therein, the mold sections being supportably moveable relative to one another, each mold section defines a portion of the mold cavity and the mold sections define the mold cavity when positioned in engagement with one another;

means for providing a reduced pressure in the vacuum chamber while the vacuum chamber is sealed, the reduced pressure means coupled in fluid communication with the outlet port;

means for injecting resin into the mold cavity, the resin injecting means coupled in fluid communication with one of the mold sections and the mold cavity;

means for controllably supporting and moving the mold sections toward and away from one another; and a controller for controlling movement of the supporting and moving means and the operation of the reduced pressure means, so that the mold sections are moved into and supported in a first, spaced apart relationship in which the mold cavity communicates with the vacuum chamber, and a reinforcing material positioned between the mold sections remains in a substantially uncompressed condition while the reduced pressure means is operated to reduce the pressure within the vacuum chamber and the mold cavity.

2. An apparatus as defined in claim 1, wherein the vacuum chamber means comprises a first, generally planar platen, a second, generally planar platen, and a flexible member hermetically coupled to and extending between the first and second platens.

3. An apparatus as defined in claim 2, wherein an inlet port is defined in the flexible member, and the resin injection means is coupled in fluid communication with the mold cavity through the inlet port.

4. An apparatus as defined in claim 2, wherein a first mold section is removably secured to one of the first and second platens, and a second mold section is removably secured to the other of the first and second platens.

5. An apparatus as defined in claim 1, wherein the controller operates the supporting and moving means to move and support the mold sections into an engaging relationship with one another while the resin injection means injects resin into the mold cavity.

6. An apparatus as defined in claim 5, wherein the controller controls the resin injecting means to terminate the resin injection in response to the supporting and moving means moving and supporting the mold sections into an engaging relationship.

7. An apparatus as defined in claim 1, wherein the resin injecting means injects resin substantially at a first predetermined pressure while the moving and supporting means maintains the mold sections in a second spaced apart relationship.

8. An apparatus as defined in claim 7, wherein the resin injecting means injects resin substantially at a second predetermined pressure while the moving and supporting means maintains the mold sections in the engaging relationship.

* * * * *